United States Patent
Nolan et al.

(10) Patent No.: US 7,507,933 B2
(45) Date of Patent: Mar. 24, 2009

(54) METHOD FOR FABRICATING A ROTOR SHAFT

(75) Inventors: John Francis Nolan, Cobleskill, NY (US); Lawrence Michael Grycko, Lockport, IL (US); John Matthew Sassatelli, Valley Falls, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/287,010

(22) Filed: Nov. 23, 2005

(65) Prior Publication Data

US 2007/0114209 A1    May 24, 2007

(51) Int. Cl.
*B23K 9/18* (2006.01)
(52) U.S. Cl. .................. 219/73; 219/61; 219/137 R
(58) Field of Classification Search .......... 219/73, 219/61, 137 R
See application file for complete search history.

(56) References Cited

U.S. PATENT DOCUMENTS

| | | | | |
|---|---|---|---|---|
| 4,633,554 A | * | 1/1987 | Clark et al. | 29/888 |
| 5,172,475 A | * | 12/1992 | Amos et al. | 29/889.1 |
| 5,348,212 A | * | 9/1994 | Galanes | 228/135 |
| 6,271,495 B1 | | 8/2001 | Rooney | |
| 6,454,531 B1 | * | 9/2002 | Crawmer | 415/198.1 |

FOREIGN PATENT DOCUMENTS

JP          61-222683     * 10/1986

* cited by examiner

*Primary Examiner*—Kevin P Kerns
(74) *Attorney, Agent, or Firm*—Armstrong Teasdale LLP

(57) ABSTRACT

A method for fabricating a rotor shaft using a welding process. The method includes positioning a first rotor shaft section adjacent a second rotor shaft section, and using a submerged arc welding process with an included weld preparation angle of between about 0° and about 30° to join the first and second rotor shaft sections together.

18 Claims, 8 Drawing Sheets

METHOD FOR FABRICATING A ROTOR SHAFT

BACKGROUND OF THE INVENTION

This invention relates generally to methods for fabricating rotor shafts, and more specifically to methods for repairing damaged rotor shafts for turbine generators.

At least some known turbine generators include one or more turbines coupled to a generator. The generator may include a rotor shaft that is coupled to one or more turbines via a coupling. Over time, such rotors may develop cracks, such as, but not limited to, at holes, fillets, and/or diameter changes along the shaft. Such cracks may sometimes propagate to a bore of the rotor, which may adversely affect a performance of the rotor and/or over time may shorten the useful life of the rotor. For example, the rotor shaft may include one or more keyways to facilitate radial alignment with the coupling. Stress cracks may develop at and/or adjacent such keyways, which may cause the rotor shaft to fail adjacent and/or underneath the coupling.

To repair a cracked rotor shaft, a section of the rotor shaft including the crack is sometimes cut off from an undamaged section of the rotor shaft and replaced with a new section. For example, if one or more keyways within an end of the rotor shaft that is coupled to the turbines are cracked, the cracked end may be cut from the rotor shaft and replaced with a new stub shaft end. At least some known methods for welding a new shaft section to an existing rotor shaft include using a combination of Gas Tungsten Arc Welding (GTAW) and Submerged Arc Welding (SAW). More specifically, and for example, at least some known methods include using a weld preparation angle of about 45° or more included, and applying one or more buttering layers using GTAW to trap elements in the base material and to minimize dilution into the weld. Such methods also use SAW to complete the weld between the new shaft section and the existing rotor shaft. However, the weld preparation angle and applied buttering layers may increase an amount of metal used to complete the weld, and may possibly increase a cost and/or time of completing the repair. Moreover, the use of both GTAW and SAW processes may require more equipment and/or operator training, and/or or may increase a time of completing the repair.

At least some other known methods used for welding a new shaft section to an existing rotor shaft include narrow groove GTAW, wherein a narrow groove with parallel sidewalls is used for the weld preparation. Although narrow groove GTAW may not require buttering layers to trap elements in the base material and minimize dilution into the weld, narrow groove GTAW may be limited by the depth of weld attainable. Moreover, narrow groove GTAW may require more operator training and/or specialized equipment, which may increase a cost and/or time of completing the repair.

BRIEF DESCRIPTION OF THE INVENTION

A method is provided for fabricating a rotor shaft using a welding process. The method includes positioning a first rotor shaft section adjacent a second rotor shaft section, and using a submerged arc welding process with an included weld preparation angle of between about 0° and about 30° to join the first and second rotor shaft sections together.

A method is provided for repairing a rotor shaft. The method includes separating the shaft into a damaged section and an undamaged section, providing a replacement section for use in repairing the rotor shaft, aligning the undamaged and replacement sections, and using a submerged arc welding (SAW) process including an included weld preparation angle of between about 0° and about 30° to join the undamaged and replacement sections.

DETAILED DESCRIPTION OF THE INVENTION

As used herein, the terms "fabricating" and "fabrication" are intended to include repairing an existing rotor shaft and making a new rotor shaft.

Figure 1:
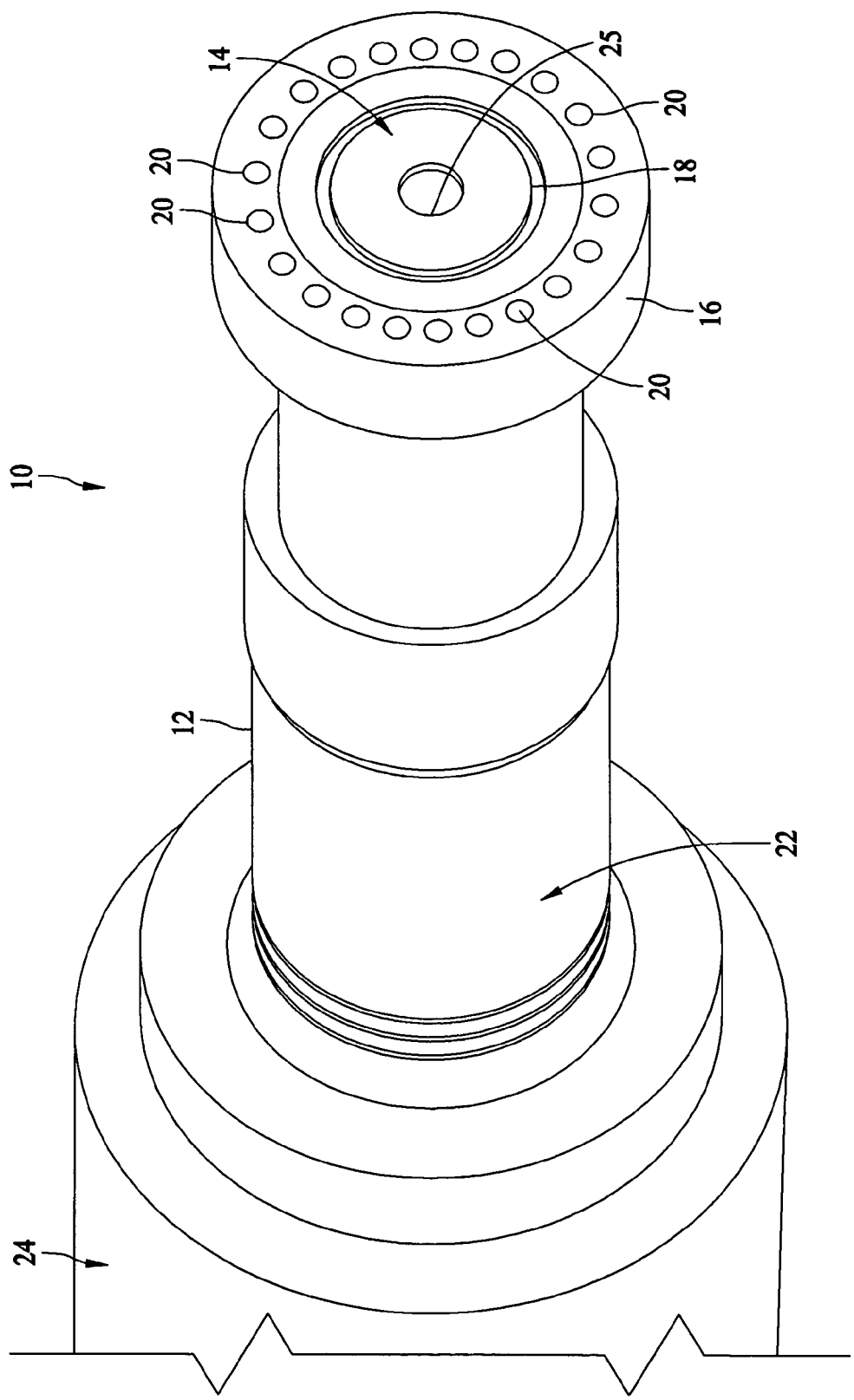
FIG. 1 is a perspective view of a portion of an exemplary turbine generator rotor shaft assembly.

FIG. 1 is a perspective view of an exemplary turbine generator rotor shaft assembly 10. Assembly 10 includes a rotor shaft 12 having an end portion 14 coupled to a coupling 16 that couples to one or more turbine(s) (not shown). Although rotor shaft 12 may be coupled to coupling 16 in any suitable manner, fashion, arrangement, configuration, and/or by any suitable structure and/or means, in the exemplary assembly 10 end portion 14 is received within an opening 18 of coupling 16 and fixedly secured thereto using an interference fit. Alternatively, coupling 16 may be integrally formed with rotor shaft 12. Although coupling 16 may couple to the turbine(s) in any suitable manner, fashion, arrangement, configuration, and/or by any suitable structure and/or means, in the exemplary assembly 10 coupling 16 includes a plurality of openings 20 for receiving a plurality of fasteners (not shown) that couple coupling 16 to the turbine(s). Rotor shaft 12 also includes an end portion 22 that is opposite end portion 14 and is coupled to a generator 24. Rotor shaft 12 may be coupled to generator 24 in any suitable manner, fashion, arrangement, configuration, and/or by any suitable structure and/or means, such as, but not limited to, an interference fit. Alternatively, rotor shaft 12 may be integrally formed with a coupling (not shown) that couples to generator 24 or may be integrally formed with at least a portion of generator 24. In the exemplary embodiment, rotor shaft 12 includes a central bore 25 extending therethrough.

Generally, rotation of the turbine(s) may be driven by any suitable means, such as, but not limited to, steam, water, and/or combustion gases. The turbine(s) drive rotation of rotor shaft 12, and generator 24 generates electrical power using the rotation of rotor shaft 12. The general operation of assembly 10 for generating electrical power is known in the art and will therefore not be described in more detail herein.

Figure 2:
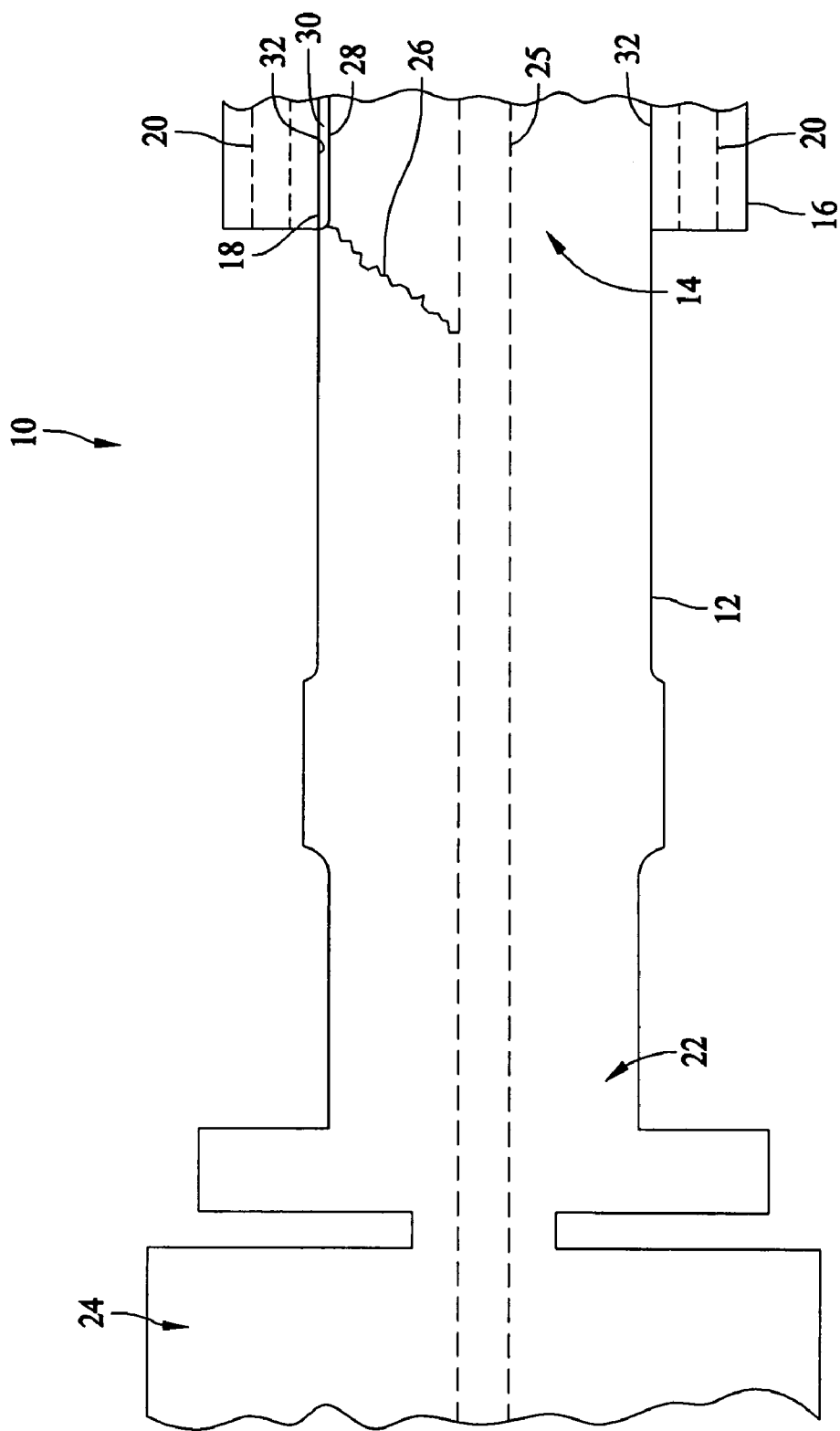
FIG. 2 is partial cross-sectional view of the turbine generator rotor shaft assembly shown in FIG. 1 illustrating a crack therein.
Figure 3:
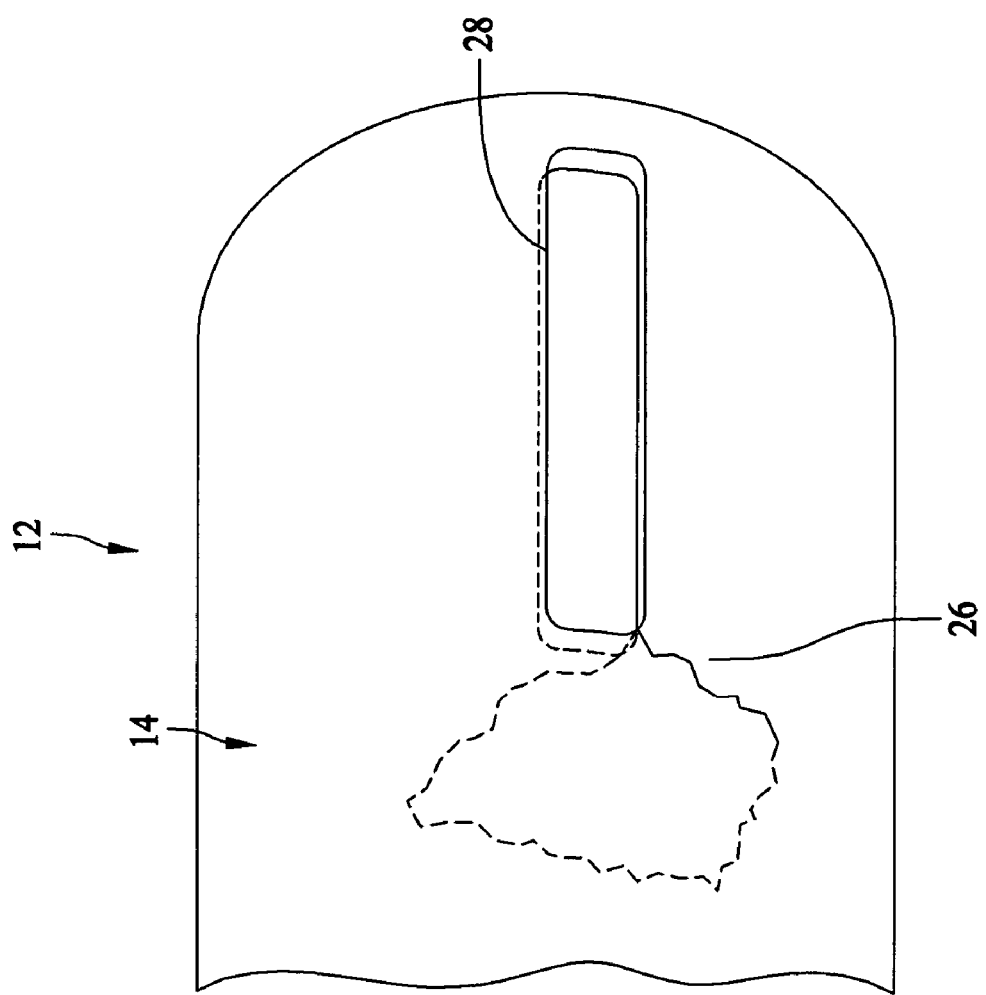
FIG. 3 is a perspective view of a portion of the rotor shaft shown in FIGS. 1 and 2 illustrating the crack within an exemplary keyway of rotor shaft 12.

FIG. 2 is partial cross-sectional view of assembly 10 illustrating a crack 26 within rotor shaft 12. FIG. 3 is a perspective view of a portion of rotor shaft end portion 14 illustrating crack 26 within a keyway 28 of rotor shaft 12. Keyway 28 facilitates radially aligning coupling 16 and rotor shaft 12 by receiving an extension 30 of coupling 16 that extends radially inward from a radially inner surface 32 that defines coupling opening 18. In some embodiments, keyway 28 may facilitate driving rotation of shaft 12 from rotation of coupling 16, or vice versa. Although crack 26 may have any size, shape, depth, and/or location within rotor shaft 12, in the exemplary embodiment crack 26 is located within rotor shaft end portion 14, and more specifically partially within keyway 28. Although a specific example of keyway 28 is illustrated in FIGS. 2 and 3, keyway 28 may have any suitable size, shape, and/or location enabling it to perform the functions described herein. In some embodiments, rotor shaft 12 does not include keyway 28.

Figure 4:
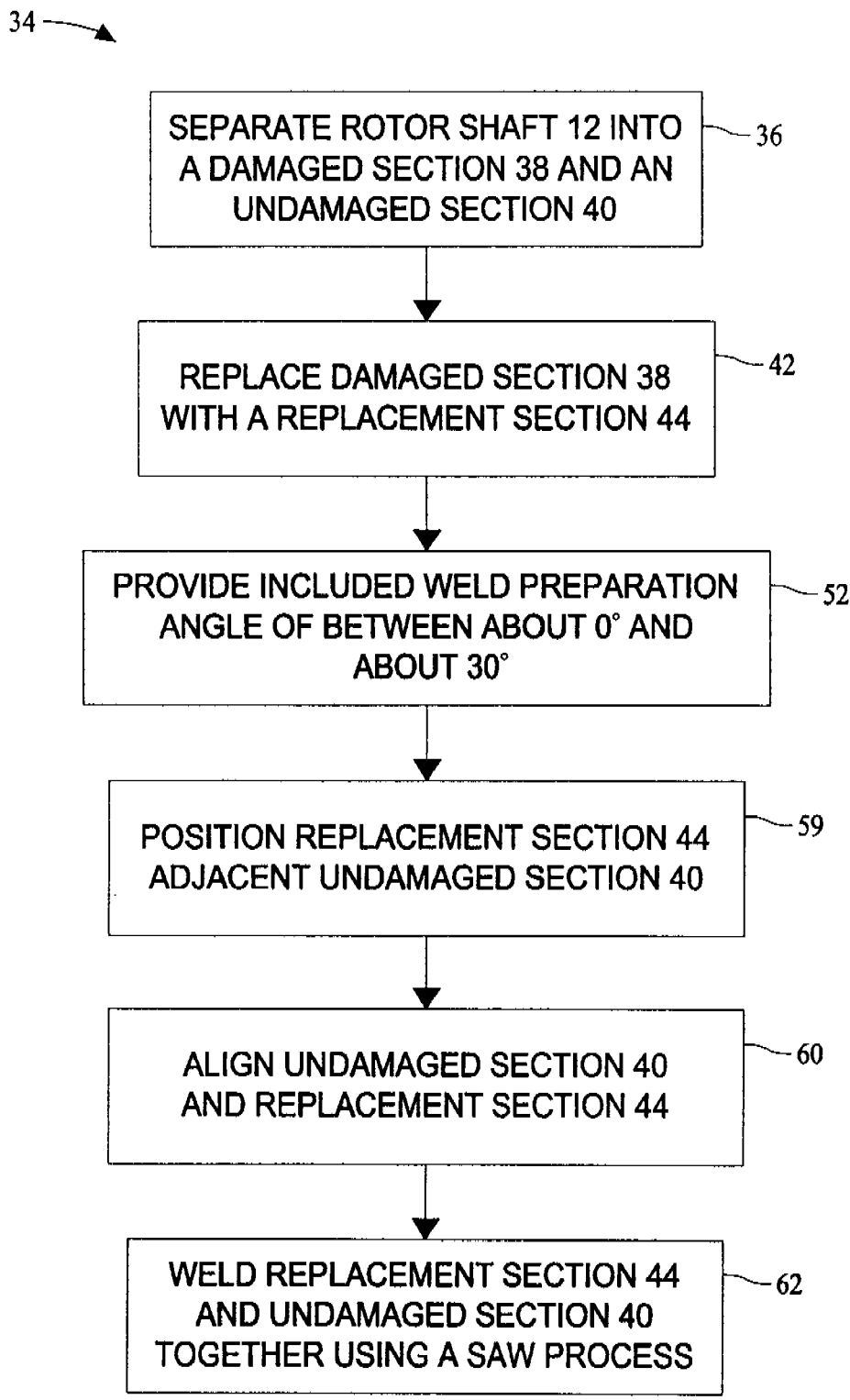
FIG. 4 is a flowchart illustrating an exemplary embodiment of a method for repairing the crack shown in FIGS. 2 and 3 using a submerged arc welding (SAW) process.
Figure 5:
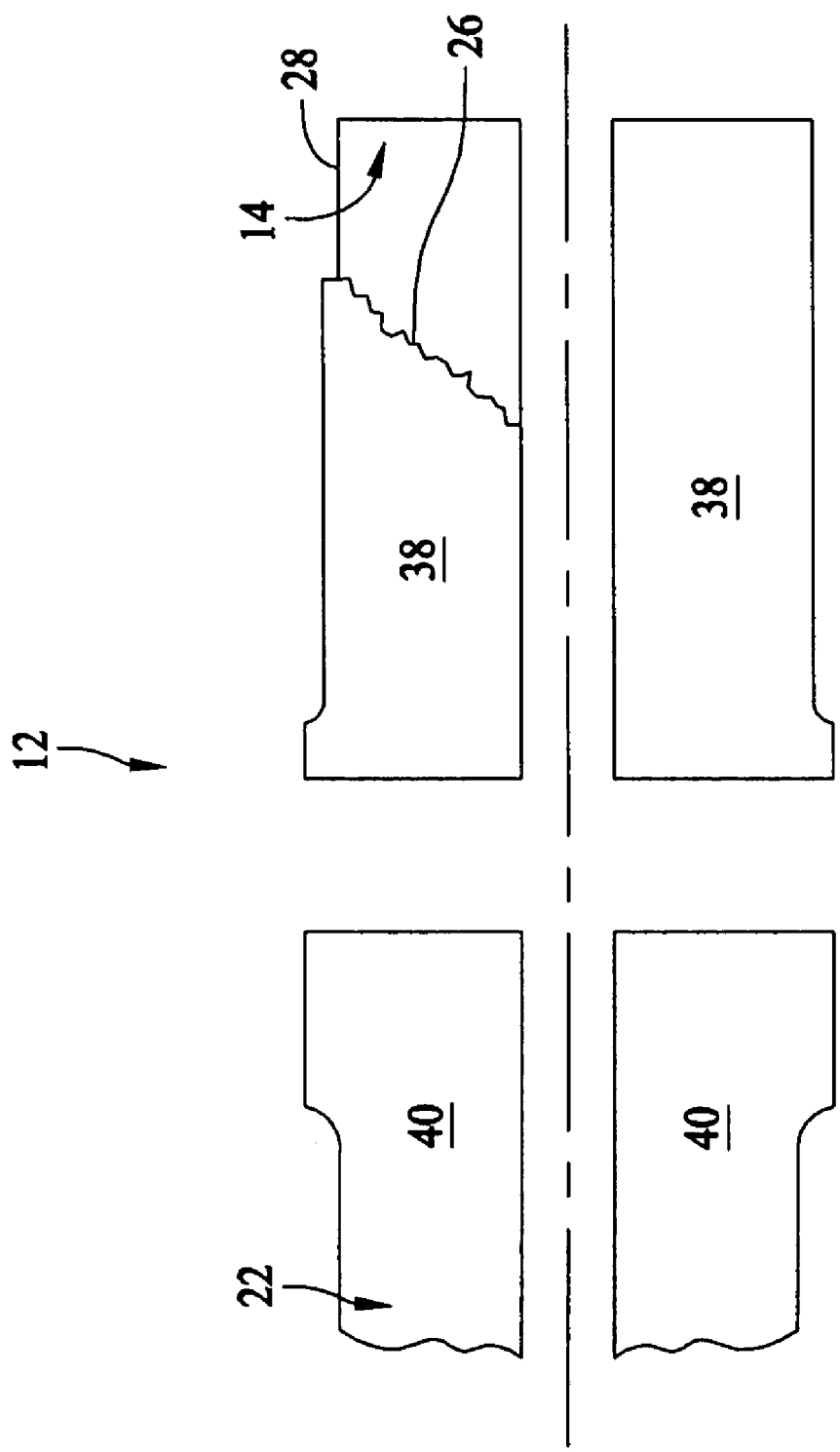
FIG. 5 is a partial cross-sectional view of the rotor shaft shown in FIGS. 1-3 illustrating the shaft being severed into a damaged section and an undamaged section.

FIG. 4 is a flowchart illustrating an exemplary embodiment of a method 34 for repairing crack 26 using a submerged arc welding (SAW) process. Although method 34 is described and illustrated herein as repairing crack 26, it should be understood that the methods described and/or illustrated herein, including one or more steps thereof, may be used instead for fabricating a new rotor shaft 12 from one or more separate sections (not shown). Method 34 includes separating 36 rotor shaft 12 into a damaged section 38, including end portion 14, and an undamaged section 40, including end portion 22 and crack 26, as shown in FIG. 5. Rotor shaft 12 may be separated 36 in any location that facilitates separating shaft 12 into damaged section 38 and undamaged section 40. In the exemplary embodiment, rotor shaft 12 is separated 36 between the turbine(s) (not shown) and generator 24 (shown in FIGS. 1 and 2), whether shaft 12 is coupled to the turbine(s) and/or generator 24 during separation 36. Rotor shaft 12 may be separated 36 using any suitable method and/or means. Before or after rotor shaft 12 is separated 36, rotor shaft end portion 14 may be removed, or de-coupled, from coupling 16 (shown in FIGS. 1 and 2).

Figure 6:
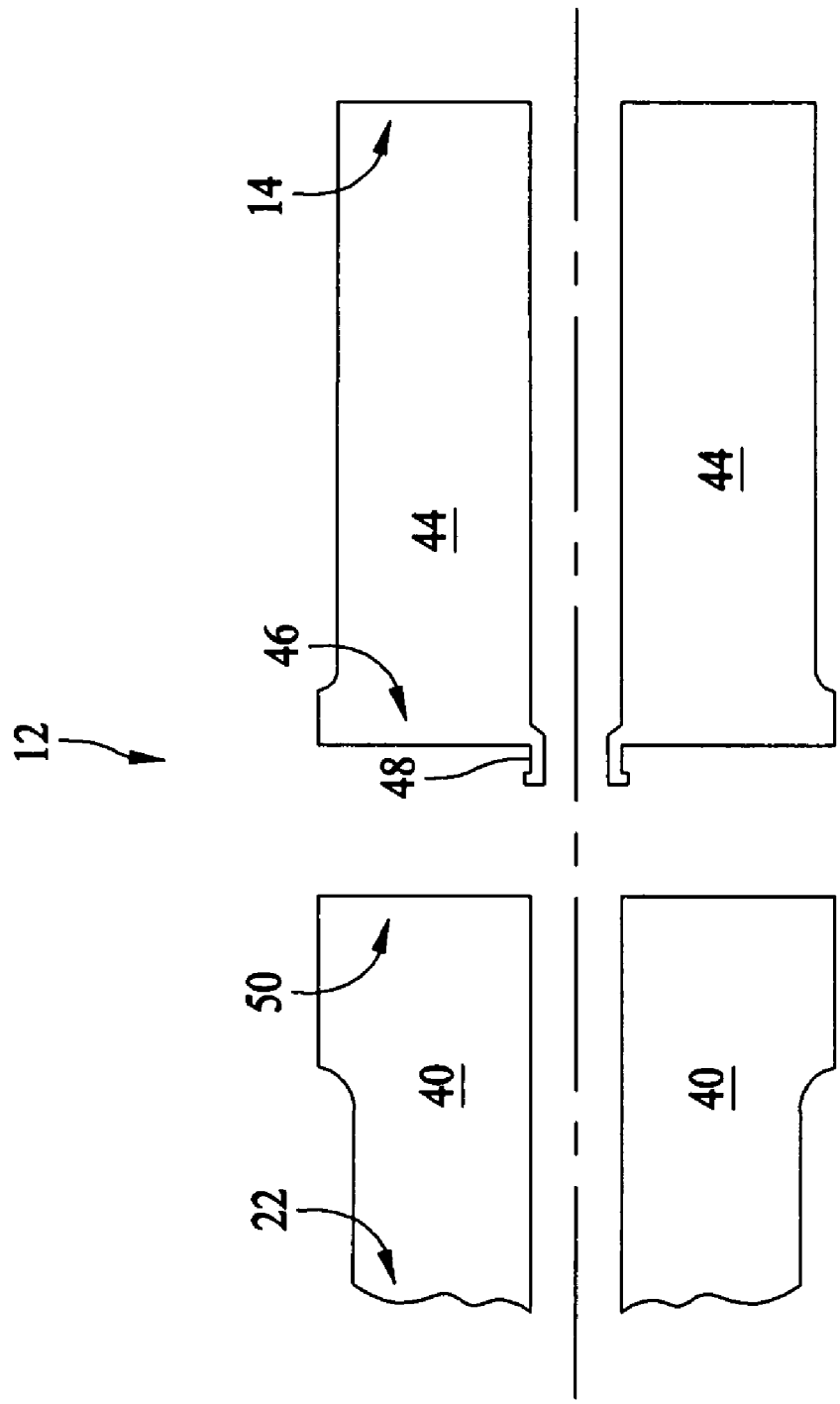
FIG. 6 is a partial cross-sectional view of the rotor shaft shown in FIGS. 1-3 illustrating replacement of the damaged section with a replacement section.

Once separated 36, damaged section 38 is replaced 42 with a replacement section 44, as shown in FIG. 6. Replacement section 44 may or may not be substantially similar to damaged section 38 which it replaces, excluding crack 26 of course. For example, replacement section 44 may have a different size and/or shape than damaged section 38 to facilitate inspecting a weld between replacement section 44 and undamaged section 40 (wherein some extra material may be removed after such inspection) and/or to facilitate a design change. Replacement section 44 includes end portion 14 for coupling to coupling 16 (shown in FIGS. 1 and 2) and an opposite end portion 46. In some embodiment, replacement section 44 includes a flange 48 extending outwardly from end portion 46. Flange 48 may facilitate radial and/or axial alignment of replacement section 44 and undamaged section 40. The separated undamaged section 40 of rotor shaft 12 also includes an end portion 50 that is opposite undamaged section end portion 22.

Figure 7:
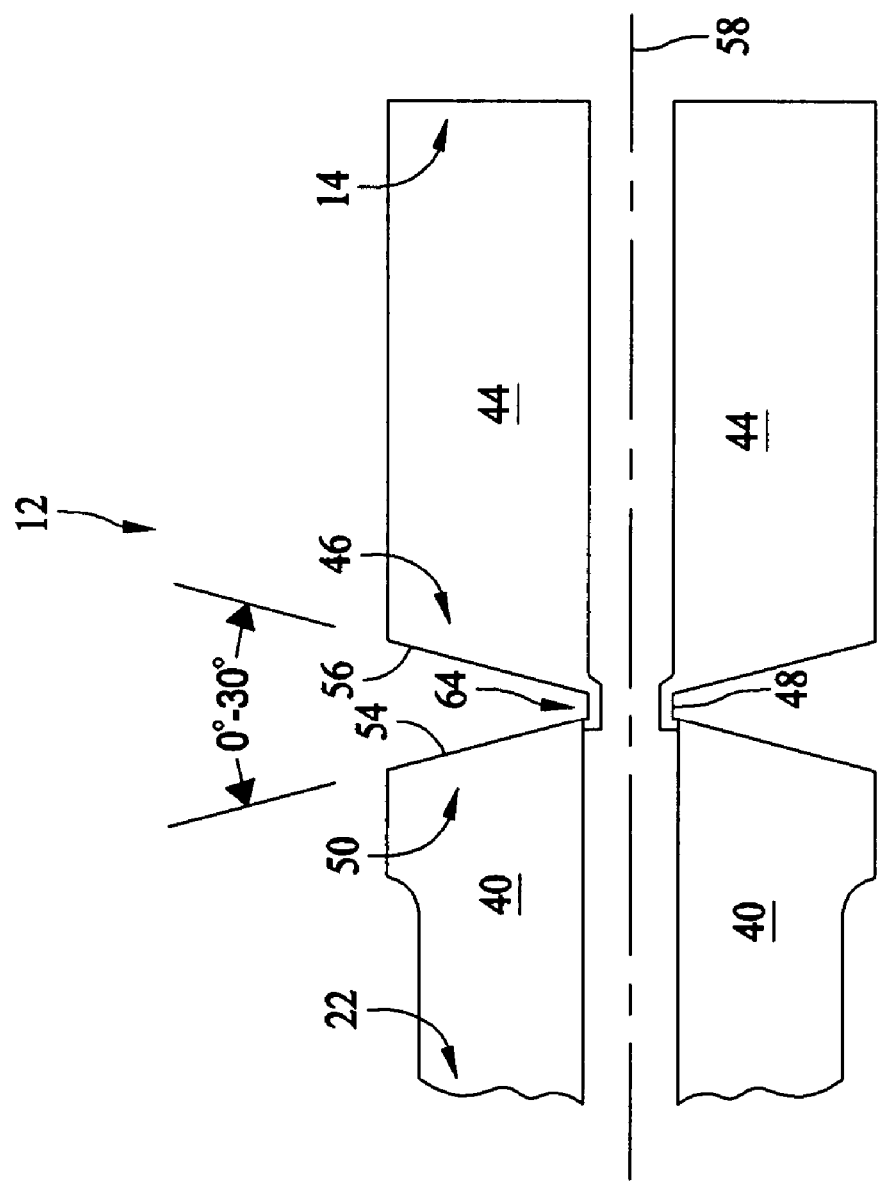
FIG. 7 is a partial cross-sectional view of the rotor shaft shown in FIGS. 1-3 illustrating a weld preparation angle of between about 0° and about 30°.
Figure 8:
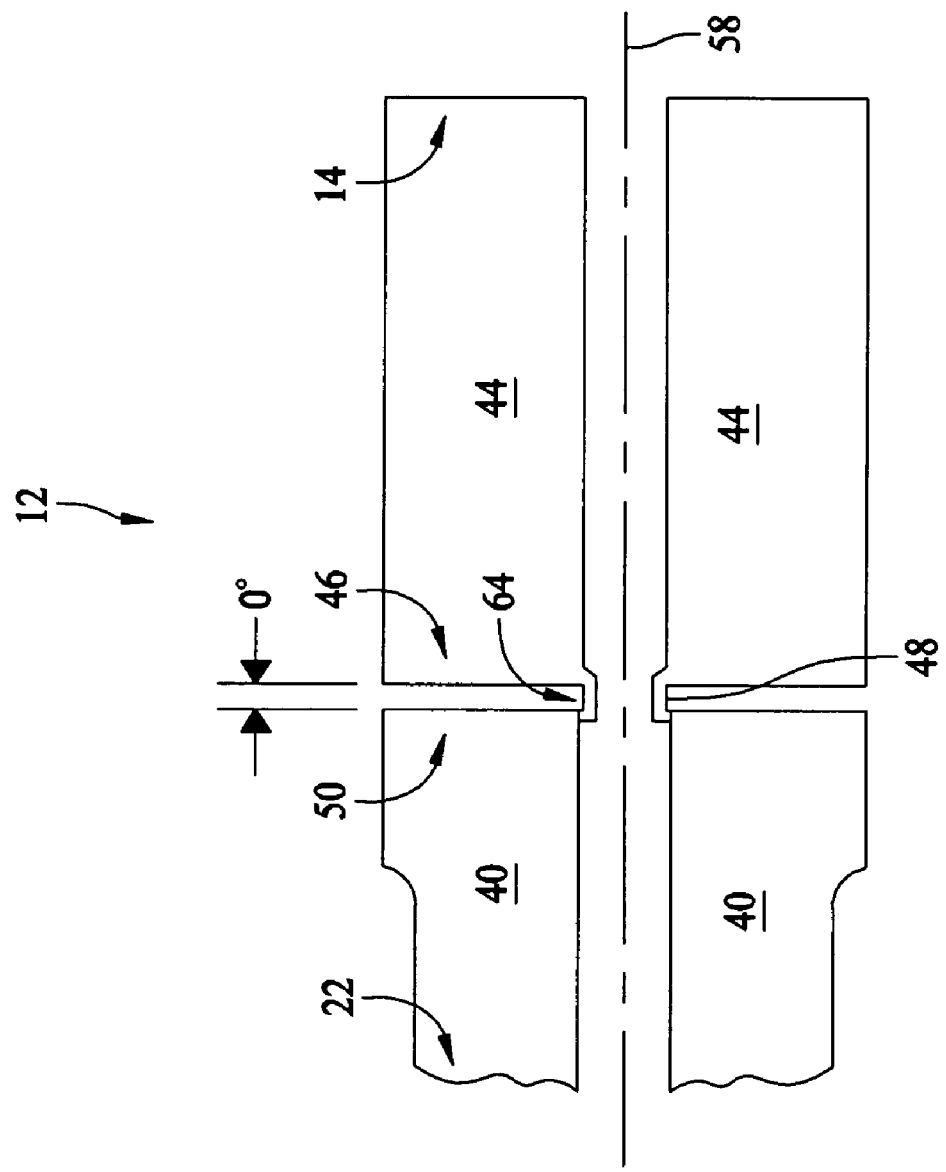
FIG. 8 is a partial cross-sectional view of the rotor shaft shown in FIGS. 1-3 illustrating a weld preparation angle of about 0°.

Replacement section 44 and undamaged section 40 are joined together using a SAW process. Specifically, sections 44 and 40 are welded together using SAW with an included weld preparation angle of between about 0° and about 30°, as shown in FIGS. 7 and 8. In some embodiments, sections 44 and 40 are welded together using an included weld preparation angle of between about 10° and about 30°. In some embodiments sections 44 and 40 are welded together using an included weld preparation angle of between about 20° and about 24°. In some embodiments, sections 44 and 40 are welded together using an included weld preparation angle of about 22°. In some embodiments, sections 44 and 40 are welded together using an included weld preparation angle of about 0°, as shown in FIG. 8. Accordingly, method 34 includes providing 52 an included weld preparation angle of between about 0° and about 30°. Although the included weld preparation angle may be provided 52 using any suitable method and/or process (such as, but not limited to, a relative orientation of sections 40 and 44), and/or by any suitable means, in some embodiments undamaged section end portion 50 and replacement section end portion 46 are machined, using any suitable method, process, and/or means. More specifically, in some embodiments end portion sections 40 and 44 are each machined into a frustoconical shape having a respective surface 54 and 56 angled at between about 85° and about 75° with respect to a central longitudinal axis 58 of each section 40 and 44 (shown as the same axis in FIGS. 7 and 8 because sections 40 and 44 are substantially concentrically aligned).

To join sections 40 and 44 together, method 34 also includes positioning 59 replacement section 44 adjacent undamaged section 40 and aligning 60 sections 40 and 44 such that surfaces 54 and 56 generally face each other, as shown in FIGS. 7 and 8. More specifically, in the exemplary embodiment sections 40 and 44 are aligned 60 such that sections 40 and 44 are substantially concentrically aligned with respect to each other. Once aligned 60, sections 40 and 44 are welded 62 together using a SAW process. In some embodiments, replacement section 44 and/or undamaged section 40 are rotated during the welding process. SAW is know in the art and therefore the general operation of which to weld sections 40 and 44 together will not be described in more detail herein. Before, during, or after sections 40 and 44 are welded together, keyway 28, if included, may be machined in replacement section end portion 14. Moreover, before, during, or after sections 40 and 44 are welded together, replacement section end portion 44 may be coupled to coupling 16 (shown in FIGS. 1 and 2), and coupling 16 may be coupled to the turbine(s). In alternative embodiments, wherein replacement section 44 replaces an end portion (e.g., end portion 22) of rotor shaft 12 that couples to generator 24, before, during, or after sections 40 and 44 are welded together, replacement section end portion 44 may be coupled to generator 24 (whether directly or using a coupling (not shown)). Moreover, in some embodiments replacement section 44 may be integrally formed with coupling 16, a coupling (not shown) that couples to generator 24, or may be integrally formed with at least a portion of generator 24 or the turbine(s).

The methods described and/or illustrated herein may facilitate cost-effective, efficient, and reliable fabrication (including repair) of rotor shaft 12. More specifically, by using a SAW process with an included weld preparation angle of between about 0° and about 30°, the methods described and/or illustrated herein may facilitate reducing an amount of weld deposit during fabrication of shaft 12. For example, using an included weld preparation angle of between about 0° and about 30° may facilitate reducing dilution of base material into the weld deposit, which may eliminate the need to apply one or more buttering layers prior to the SAW process. Additionally, changing the incident angle such that the molten weld material washes surfaces 54 and 56 may facilitate reducing dilution of base material into the weld deposit, and therefore may facilitate a stronger overall weld between sections 40 and 44. For example, in some embodiments welding 62 replacement section 44 and undamaged section 40 together includes using an incident angle of between about 30° and about 60° with respect to surfaces 54 and 56. Using an incident angle of between about 30° and about 60° with respect to surfaces 54 and 56 may facilitate reducing or eliminating cold lap, wherein less base material melts because molten weld material flows down surfaces 54 and 56. Reducing a heat input when welding surfaces 54 and 56 as compared with welding a root opening (shown in FIGS. 7 and 8 and designated by the reference numeral 64), sometimes referred to as a center weld face once at least partially welded, may also facilitate reducing dilution of base material into the weld deposit, and therefore may facilitate a stronger overall weld between sections 40 and 44. In some embodiments welding 62 replacement section 44 and undamaged section 40 together includes using welding surfaces 54 and/or 56 at a heat input that is between about 7% and about 20% lower than a heat input used to weld root opening 64. For example, in some embodiments wherein sections 40 and 44 include low alloy steel and have an outer diameter of between about 12 and about 30 inches, welding surfaces 54 and/or 56 at a heat input that is between about 7% and about 20% lower than a heat input used to weld root opening 64 may facilitate reducing dilution of base material into the weld deposit. Moreover, because the rotor shaft is welded using only SAW, a number of operations and/or pieces of equipment may be reduced, possibly reducing a cost and/or time of fabrication and/or repair.

Although the methods described and/or illustrated herein are described and/or illustrated with respect to repairing a rotor shaft, practice of the methods described and/or illustrated herein is not limited to repairing rotor shafts. Rather, the methods described and/or illustrated herein are also applicable to making a new rotor shaft.

Although the methods described and/or illustrated herein are described and/or illustrated with respect to a turbine generator, and more specifically a rotor shaft for a turbine generator, practice of the methods described and/or illustrated herein is not limited to turbine generator rotor shafts, nor turbine generators generally. Rather, the methods described and/or illustrated herein are applicable to fabricating any rotor shaft.

Exemplary embodiments of methods are described and/or illustrated herein in detail. The methods are not limited to the specific embodiments described herein, but rather, steps of each method may be utilized independently and separately from other steps described herein. Each method step can also be used in combination with other method steps.

When introducing elements, components, steps, etc. of the methods described and/or illustrated herein, the articles "a", "an", "the" and "said" are intended to mean that there are one or more of the element(s), component(s), step(s), etc. The terms "comprising", "including" and "having" are intended to be inclusive and mean that there may be additional element(s), component(s), step(s), etc. other than the listed element(s), component(s), step(s), etc.

While the invention has been described in terms of various specific embodiments, those skilled in the art will recognize that the invention can be practiced with modification within the spirit and scope of the claims.

What is claimed is:

1. A method for fabricating a rotor shaft using a welding process, said method comprising:

positioning a first rotor shaft section adjacent a second rotor shaft section such that a backing portion of the first rotor shaft section is positioned radially inward from the second rotor shaft section; and creating a weld within a gap defined between the first and second rotor shaft sections, wherein the weld includes a first weld portion and a second weld portion, said step of creating a weld comprises:

welding the first weld portion adjacent a root opening at a first heat input using a submerged arc welding (SAW) process;

welding the second weld portion adjacent a sidewall at a second heat input that is different than and at a reduced temperature than the first heat input to facilitate reducing dilution of a base material of the first and second rotor shaft sections into a welding material, wherein the second weld portion is welded using the SAW process, with an included weld preparation angle of between about 0° and about 30°; and changing an incident angle during welding to ensure that molten weld material flows along a first sidewall defined on the first rotor shaft section and along a second sidewall defined on the second rotor shaft section, to facilitate reducing dilution of the base material into a weld deposit.

2. A method in accordance with claim 1 wherein positioning a first rotor shaft section adjacent a second rotor shaft section further comprises aligning the first rotor shaft section substantially concentrically with the second rotor shaft section.

3. A method in accordance with claim 1 wherein welding the second weld portion adjacent a sidewall at a second heat input that is different than and at a reduced temperature than the first heat input further comprises using a SAW process with an included weld preparation angle of about 22°.

4. A method in accordance with claim 1 further comprising rotating the pair of rotor shaft sections during the weld process.

5. A method in accordance with claim 1 wherein positioning a first rotor shaft section adjacent a second rotor shaft section further comprises positioning a first rotor shaft section having one of a turbine and a generator integrally formed with the first rotor shaft section at an end portion of the first rotor shaft section.

6. A method in accordance with claim 1 further comprising coupling an end portion of one of the first rotor shaft section and the second rotor shaft section to one of a turbine and a generator.

7. A method in accordance with claim 6 wherein coupling an end portion of one of the first rotor shaft section and the second rotor shaft section further comprises coupling the end portion to one of a turbine and a generator using an interference fit.

8. A method in accordance with claim 1 wherein welding the second weld portion adjacent a sidewall at a second heat input that is different than and at a reduced temperature than the first heat input further comprises using a SAW process with the incident angle of between about 30° and about 60°.

9. A method in accordance with claim 1 wherein welding the second weld portion adjacent a sidewall at a second heat input that is different than and at a reduced temperature than the first heat input further comprises welding the sidewall at a second heat input that is between about 7% and about 20% less than the first heat input.

10. A method for repairing a rotor shaft, said method comprising:

separating the shaft into a damaged section and an undamaged section;

providing a replacement section for use in repairing the rotor shaft;

aligning the undamaged and replacement sections such that a backing portion of the replacement section is positioned radially inward from the undamaged section; and creating a weld within a gap defined between the undamaged section and the replacement section, wherein the weld includes a first weld portion and a second weld portion, said step of creating a weld comprises:

welding the first weld portion adjacent a root opening at a first heat input using a submerged arc welding (SAW) process;

welding the second weld portion adjacent a sidewall at a second heat input that is different than and at a reduced temperature than the first heat input to facilitate reducing dilution of a base material of the undamaged section and the replacement section into a welding material, wherein the second weld portion is welded using the SAW process, including an included weld preparation angle of between about 0° and about 30°; and changing an incident angle during welding to ensure that molten weld material flows along a first sidewall defined on the undamaged section and along a second sidewall defined on the replacement section, to facilitate reducing dilution of the base material into a weld deposit.

11. A method in accordance with claim 10 wherein welding the second weld portion adjacent a sidewall at a second heat input that is different than and at a reduced temperature than the first heat input further comprises using a SAW process with an included weld preparation angle of about 22°.

12. A method in accordance with claim 10 wherein welding the second weld portion adjacent a sidewall at a second heat input that is different than and at a reduced temperature than the first heat input using a SAW process further comprises:

machining an end portion of the undamaged section into a frustoconical shape having a surface angled at between about 85° and about 75° with respect to a central longitudinal axis of the undamaged section; and machining an end portion of the replacement section into a frustoconical shape having a surface angled at between about 85° and about 75° with respect to a central longitudinal axis of the replacement section.

13. A method in accordance with claim 10 wherein aligning the undamaged and replacement sections further comprises aligning the replacement and undamaged sections such that the sections are substantially concentrically aligned with respect to each other.

14. A method in accordance with claim 10 wherein providing a replacement section for use in repairing the rotor shaft further comprises providing a replacement section having one of a turbine and a generator integrally formed with the replacement section at an end portion of the replacement section.

15. A method in accordance with claim 10 further comprising coupling an end portion of the replacement section to one of a turbine and a generator.

16. A method in accordance with claim 10 further comprises machining a keyway within a surface of the replacement section.

17. A method in accordance with claim 10 wherein welding the second weld portion adjacent a sidewall at a second heat input that is different than and at a reduced temperature than the first heat input further comprises using a SAW process with the incident angle of between about 30° and about 60°.

18. A method in accordance with claim 10 wherein welding the second weld portion adjacent a sidewall at a second heat input that is different than and at a reduced temperature than the first heat input further comprises welding the sidewall at a second heat input that is between about 7% and about 20% less than the first heat input.

* * * * *